US010531125B2

United States Patent
Gao et al.

(10) Patent No.: US 10,531,125 B2
(45) Date of Patent: Jan. 7, 2020

(54) VIDEO COMPRESSION METHOD AND VIDEO COMPRESSOR

(71) Applicant: Huawei Technologies Co., Ltd., Shenzhen, Guangdong (CN)

(72) Inventors: Jian Gao, Hangzhou (CN); Feng Zhou, Shenzhen (CN); Yang Song, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 473 days.

(21) Appl. No.: 14/982,135

(22) Filed: Dec. 29, 2015

(65) Prior Publication Data

US 2016/0134894 A1 May 12, 2016

Related U.S. Application Data

(63) Continuation of application No. PCT/CN2014/071519, filed on Jan. 26, 2014.

(30) Foreign Application Priority Data

Aug. 29, 2013 (CN) .......................... 2013 1 0385187

(51) Int. Cl.
 *H04N 19/70* (2014.01)
 *H04N 19/107* (2014.01)
 *H04N 19/176* (2014.01)

(52) U.S. Cl.
 CPC ........... *H04N 19/70* (2014.11); *H04N 19/107* (2014.11); *H04N 19/176* (2014.11)

(58) Field of Classification Search
 CPC .... H04N 19/70; H04N 19/107; H04N 19/176; H04N 19/423; H04N 21/23439

(Continued)

(56) References Cited

U.S. PATENT DOCUMENTS 6,330,665 B1 12/2001 Wise et al.
6,466,248 B1 10/2002 Spann et al.
(Continued)

FOREIGN PATENT DOCUMENTS

CN 1421099 A 5/2003
CN 1469645 A 1/2004
(Continued)

OTHER PUBLICATIONS

Subroto Bose et al., "A Single Chip Multistandard Video Codec", May 9, 1993, p. 11.4.1-11.4.4.
(Continued)

*Primary Examiner* — William C Vaughn, Jr.
*Assistant Examiner* — Jae N Noh
(74) *Attorney, Agent, or Firm* — Huawei Technologies Co., Ltd.

(57) ABSTRACT

A video compression method and a video compressor are provided to solve problems of huge resource consumption and high costs caused by performing both H.264 compression and HEVC compression. The method specifically includes: reading video signal data by using a sliding window to generate bitstream data, where bitstream data generated by reading the video signal data according to a first format is first bitstream data, and bitstream data generated by reading the video signal data according to a second format is second bitstream data; and coding the bitstream data to generate a bitstream, where a bitstream generated by coding the first bitstream data is a first bitstream, and a bitstream generated by coding the second bitstream data is a second bitstream, where the second format is a format preset according to the first format. The present invention is applied to video signal compression.

11 Claims, 7 Drawing Sheets

(58) Field of Classification Search
USPC .................................................. 375/240.13
See application file for complete search history.

(56) References Cited

U.S. PATENT DOCUMENTS

| | | | |
|---|---|---|---|
| 8,732,384 B1* | 5/2014 | Scharam | G06F 13/28 |
| | | | 711/100 |
| 2004/0008770 A1 | 1/2004 | Okada et al. | |
| 2006/0291564 A1 | 12/2006 | Marquant et al. | |
| 2007/0147440 A1 | 6/2007 | Song et al. | |
| 2013/0148733 A1* | 6/2013 | Park | H04N 19/51 |
| | | | 375/240.16 |
| 2014/0169467 A1* | 6/2014 | Wang | H04N 19/139 |
| | | | 375/240.16 |
| 2014/0185688 A1* | 7/2014 | Kimura | H04N 19/197 |
| | | | 375/240.18 |
| 2015/0131713 A1* | 5/2015 | Kim | H04N 19/132 |
| | | | 375/240.02 |
| 2015/0304690 A1 | 10/2015 | Allen et al. | |

FOREIGN PATENT DOCUMENTS

| | | |
|---|---|---|
| CN | 1885945 A | 12/2006 |
| CN | 101150719 A | 3/2008 |
| CN | 101305609 A | 11/2008 |
| CN | 101536014 A | 9/2009 |
| CN | 103458244 A | 12/2013 |
| WO | 02/087248 A2 | 10/2002 |

OTHER PUBLICATIONS

Thomas Wiegand et al., "Overview of the H.264/AVC Video Coding Standard", IEEE Transactions on Circuits and Systems for Video Technology, vol. 13, No. 7, Jul. 1, 2003, p. 560-576.

Il-Koo Kim et al., Block Partitioning Structure in the HEVC Standard, IEEE Transactions on Circuit and Systems for Video Technology, vol. 22, No. 12, Dec. 1, 2012, p. 1697-1706.

Jill Boyce, "Specification text to support AVC base layer in HEVC layered extensions", Joint Collaborative Team on Video Coding (JCT-VC) of ITU-T SG 16 WP 3 and ISO/IEC JTC 1/SC 29/WG 11, Jul. 27-Aug. 2, 2013, 5 pages.

* cited by examiner

| Sub-block 8x8 | Sub-block 8x8 | Sub-block 8x8 | Sub-block 8x8 | Sub-block 8x8 | Sub-block 8x8 | Sub-block 8x8 | Sub-block 8x8 |
|---|---|---|---|---|---|---|---|
| Sub-block 16x16 | | | | Sub-block 16x16 | | | |
| Macro block | | | | Macro block | | | |
| Sub-block 32x32 | | | | | | | |
| Sub-block 8x8 | Sub-block 8x8 | Sub-block 8x8 | Sub-block 8x8 | Sub-block 8x8 | Sub-block 8x8 | Sub-block 8x8 | Sub-block 8x8 |
| Sub-block 16x16 | | | | Sub-block 16x16 | | | |
| Macro block | | | | Macro block | | | |
| Sub-block 32x32 | | | | | | | |

| Sub-block 16x16 | Sub-block 16x16 | Sub-block 16x16 | Sub-block 16x16 | Sub-block 16x16 | Sub-block 16x16 | Sub-block 16x16 | Sub-block 16x16 |
|---|---|---|---|---|---|---|---|
| Sub-block 32x32 | | | | Sub-block 32x32 | | | |
| 4 macro blocks | | | | 4 macro blocks | | | |
| CU64x64_0 | | | | | | | |
| Sub-block 16x16 | Sub-block 16x16 | Sub-block 16x16 | Sub-block 16x16 | Sub-block 16x16 | Sub-block 16x16 | Sub-block 16x16 | Sub-block 16x16 |
| Sub-block 32x32 | | | | Sub-block 32x32 | | | |
| 4 macro blocks | | | | 4 macro blocks | | | |
| Sub-block 64x64 | | | | | | | |

VIDEO COMPRESSION METHOD AND VIDEO COMPRESSOR

CROSS-REFERENCE TO RELATED APPLICATIONS

This application is a continuation of International Application No. PCT/CN2014/071519, filed on Jan. 26, 2014, which claims priority to Chinese Patent Application No. 201310385187.7, filed on Aug. 29, 2013, both of which are hereby incorporated by reference in their entireties.

TECHNICAL FIELD

The present invention relates to the field of image processing, and in particular, to a video compression method and a video compressor.

BACKGROUND

A video signal includes a large amount of information, and is difficult for storage and transmission, and therefore, video signals need to be compressed, so that the video signals are compressed. Redundancy information in a video signal includes time redundancy, space redundancy, compression redundancy, visual redundancy, and the like, and video compression aims to eliminate various types of redundancy to the maximum extent.

Currently, a major video signal compression standard is the H.264 (MPEG-4 Part 10) standard. In recent years, based on the H.264 standard, a new-generation video compression standard HEVC also appears. HEVC still follows a hybrid compression framework that is used by H.264 and includes inter-frame and intra-frame prediction compression which eliminates relevance between a time domain and a space domain; transform compression which is performed on a residue to eliminate space relevance; and entropy compression which eliminates statistical redundancy.

Currently, decoders of many terminal devices are H.264 decoders, and high efficiency video coding (HEVC) is a new standard and therefore, a video compressor needs to support both the standards. In this way, H.264 compressors will inevitably coexist with HEVC compressors within a certain time, and it is required that a compressor supports both the H.264 standard and the HEVC standard. In the prior art, a compressor implements H.264 compression and HEVC compression by using two chips respectively, leading to huge resource consumption and high costs.

SUMMARY

Embodiments of the present invention provide a video compression method and a video compressor, which implement H.264 compression and HEVC compression on one chip, thereby reducing resource consumption and costs of video compression.

To achieve the foregoing objective, the embodiments of the present invention use the following technical solutions:

According to a first aspect, a video compression method is provided, including:

reading, by a video compressor, video signal data by using a sliding window to generate bitstream data, where the video compressor separately reads the video signal data in the sliding window according to a first format and a second format, where video signal data read according to the first format is first data and generated bitstream data is first bitstream data, and video signal data read according to the second format is second data and generated bitstream data is second bitstream data; and coding, by the video compressor, the bitstream data to generate a bitstream, where a bitstream generated by coding the first bitstream data is a first bitstream, and a bitstream generated by coding the second bitstream data is a second bitstream, where the second format is a format preset according to the first format.

Optionally, with reference to the first aspect, in a first possible implementation manner, the reading, by a video compressor, video signal data by using a sliding window to generate bitstream data specifically includes:

predicting, by the video compressor, original video data according to the video signal data read by using the sliding window, so as to generate residual data, where the prediction includes intra-frame prediction and inter-frame prediction;

acquiring, by the video compressor, bitstream control information corresponding to the residual data; and combining, by the video compressor, the residual data and the bitstream control information to generate the bitstream data, where first residual data is combined with the first bitstream control information to generate the first bitstream data, and second residual data is combined with the second bitstream control information to generate the second bitstream data, where residual data generated by predicting, according to the first data, the original video data is the first residual data and corresponding bitstream control information is the first bitstream control information, and residual data generated by predicting, according to the second data, the original video data is the second residual data and corresponding bitstream control information is the second bitstream control information; and the residual data includes a difference between the original video data and the video signal data read by using the sliding window, and the bitstream control information includes a description of positions of the original video data and the video signal data read by using the sliding window and/or a description of a relationship between the original video data and the video signal data read by using the sliding window, where the descriptions are obtained after the prediction.

Optionally, with reference to the first possible implementation manner, in a second possible implementation manner, the predicting, by the video compressor, original video data according to the video signal data read by using the sliding window includes:

performing, by the video compressor, intra-frame prediction and inter-frame prediction on the original video data of a same data amount within a same time.

Optionally, with reference to the first or second possible implementation manner, in a third possible implementation manner, the reading, by a video compressor, video signal data by using a sliding window includes:

dividing, by the video compressor, the video signal data into blocks, where a data amount of a block read in the first format is the same as that of a block read in the second format.

Optionally, with reference to the third possible implementation manner, in a fourth possible implementation manner, the predicting, by the video compressor, original video data according to the video signal data read by using the sliding window specifically includes:

predicting, by the video compressor, an original video data block in a preset order according to the video signal data read by using the sliding window.

Optionally, with reference to the first aspect, or the first, second, or fourth possible implementation manner, in a fifth possible implementation manner, the coding, by the video compressor, the bitstream data to generate a bitstream further includes:

storing, by the video compressor, intermediate data needed for coding during context modeling, where a storage format of intermediate data needed for coding the first bitstream data is the same as a storage format of intermediate data needed for coding the second bitstream data.

According to a second aspect, a video compressor is provided, including: a reading unit and a coding unit, where the reading unit is configured to read video signal data by using a sliding window to generate bitstream data, where the reading unit separately reads the video signal data in the sliding window according to a first format and a second format, where video signal data read according to the first format is first data and generated bitstream data is first bitstream data, and video signal data read according to the second format is second data and generated bitstream data is second bitstream data; and the coding unit is configured to code the bitstream data generated by the reading unit to generate a bitstream, where a bitstream generated by coding the first bitstream data is a first bitstream, and a bitstream generated by coding the second bitstream data is a second bitstream, where the second format is a format preset according to the first format.

Optionally, with reference to the second aspect, in a first possible implementation manner, the reading unit includes a prediction subunit and a combining subunit, where the prediction subunit is configured to predict original video data according to the video signal data read by using the sliding window, so as to generate residual data, where the prediction includes intra-frame prediction and inter-frame prediction;

the prediction subunit is further configured to acquire bitstream control information corresponding to the residual data; and the combining subunit is configured to combine the residual data generated by the prediction subunit and the stream control information generated by the prediction subunit to generate the bitstream data, where the first residual data is combined with the first bitstream control information to generate the first bitstream data, and the second residual data is combined with the second bitstream control information to generate the second bitstream data, where residual data generated by predicting, according to the first data, the original video data is the first residual data and corresponding bitstream control information is the first bitstream control information, and residual data generated by predicting, according to the second data, the original video data is the second residual data and corresponding bitstream control information is the second bitstream control information; and the residual data includes a difference between the original video data and the video signal data read by using the sliding window, and the bitstream control information includes a description of positions of the original video data and the video signal data read by using the sliding window and/or a description of a relationship between the original video data and the video signal data read by using the sliding window, where the descriptions are obtained after the prediction.

Optionally, with reference to the first possible implementation manner, in a second possible implementation manner, the prediction subunit performs intra-frame prediction and inter-frame prediction on the original video data of a same data amount within a same time.

Optionally, with reference to the first or second possible implementation manner, in a third possible implementation manner, the reading unit is further configured to divide the video signal data into blocks, where a data amount of a block read in the first format is the same as that of a block read in the second format.

Optionally, with reference to the third possible implementation manner, in a fourth possible implementation manner, the prediction subunit predicts an original video data block in a preset order according to the video signal data read by using the sliding window.

Optionally, with reference to the second aspect, or the first, second, or fourth possible implementation manner, in a fifth possible implementation manner, the video compressor further includes a storage unit, where the storage unit is configured to store intermediate data needed for coding by the coding unit during context modeling, where a storage format of intermediate data needed for coding the first bitstream data is the same as a storage format of intermediate data needed for coding the second bitstream data.

According to the video compression method and the video compressor provided by the embodiments of the present invention, H.264 compression and HEVC compression are implemented on one chip by properly adjusting reading and coding orders of H.264 and HEVC, so that resource consumption and costs of video compression are reduced.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention.

In the prior art, operations such as reading, prediction, coding, and the like need to be performed on video signal data to complete operations on a video signal. Because orders of reading video signal data in different video coding standards are different, storage and coding manners in the different video coding standards are not compatible, and video compression of the different video coding standards cannot be implemented by using one chip.

Figure 1:
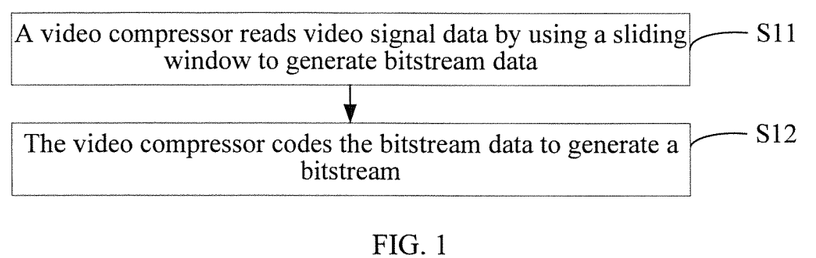
FIG. 1 is a schematic flowchart of a video compression method according to an embodiment of the present invention.

An embodiment of the present invention provides a video compression method, so as to implement H.264 compression and HEVC compression on one chip. Specifically, referring to FIG. 1, the method includes:

S11: A video compressor reads video signal data by using a sliding window to generate bitstream data.

The video compressor separately reads the video signal data in the sliding window according to a first format and a second format, where video signal data read according to the first format is first data and generated bitstream data is first bitstream data, and video signal data read according to the second format is second data and generated bitstream data is second bitstream data.

S12: The video compressor codes the bitstream data to generate a bitstream.

A bitstream generated by coding the first bitstream data is a first bitstream, and a bitstream generated by coding the second bitstream data is a second bitstream, where the second format is a format preset according to the first format.

Specifically, the first format is a format specified in the HEVC standard, and the second format is a format that is adjusted according to the first format and is compliant with the H.264 standard. That is, format reading and coding orders specified in the H.264 standard are adjusted according to a format specified in the HEVC standard; in this way, reading, storage, prediction, and coding of H.264 and HEVC can all be implemented on one chip.

According to the video compression method provided by this embodiment of the present invention, H.264 compression and HEVC compression are implemented on one chip by properly adjusting reading and coding orders of H.264 and HEVC, and thereby resource consumption and costs of video compression are reduced.

Figure 2:
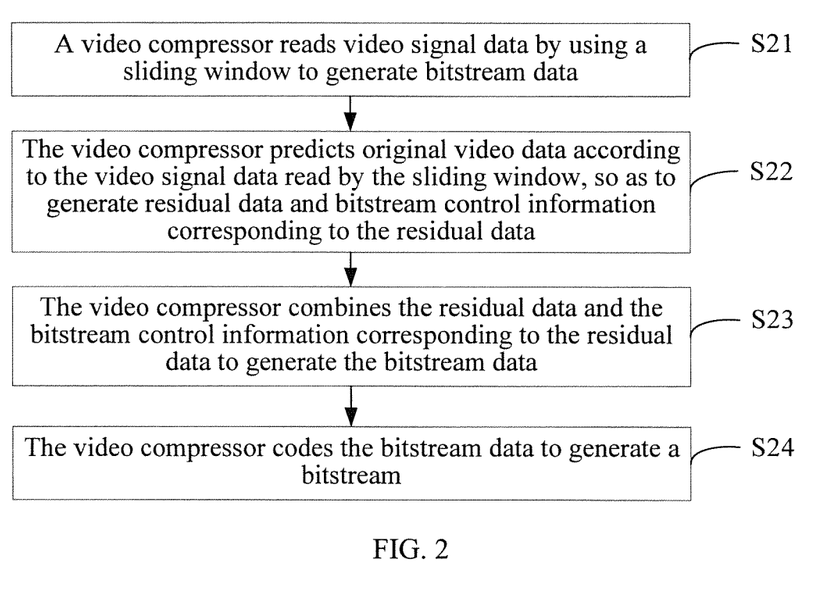
FIG. 2 is a schematic flowchart of a video compression method according to another embodiment of the present invention.

Optionally, an embodiment of the present invention further provides a specific video compression method. Referring to FIG. 2, the method includes:

S21: A video compressor reads video signal data by using a sliding window to generate bitstream data.

The video compressor separately reads the video signal data in the sliding window according to a first format and a second format, where video signal data read according to the first format is first data and generated bitstream data is first bitstream data, and video signal data read according to the second format is second data and generated bitstream data is second bitstream data. Specifically, the first format is a format specified in the HEVC standard, and the second format is a format that is adjusted according to the first format and is compliant with the H.264 standard.

Figure 3:
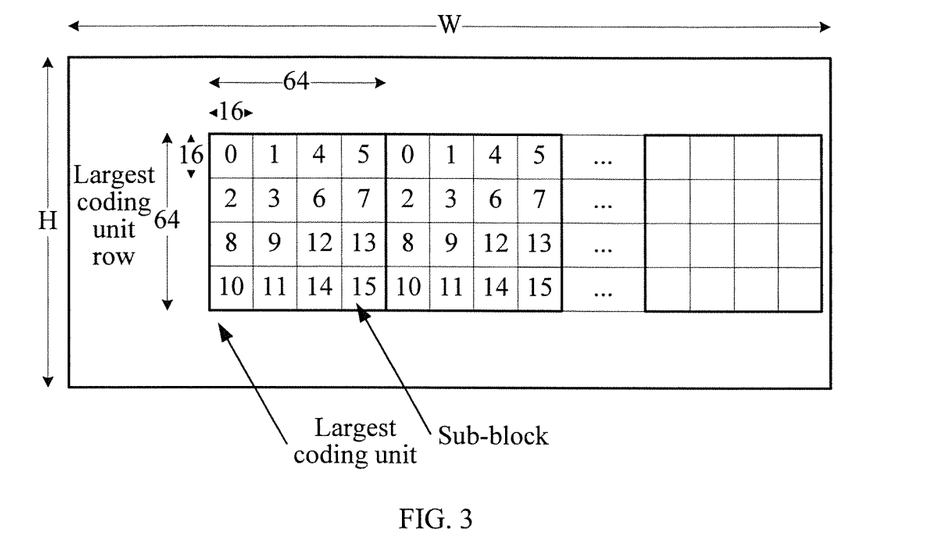
FIG. 3 is a schematic structural diagram of data read by a sliding window according to another embodiment of the present invention.

The video signal data read by using the sliding window includes reference data of original video data. Specifically, the video compressor divides the video signal data in the sliding window into blocks according to preset manners of the first format and the second format. Referring to FIG. 3, for the first format, a largest coding unit (Largest Coding Unit, LCU) in the HEVC standard is divided into blocks according to the second format, that is, the size of a macro block (Macro Block, MB) in the H.264 standard, where a block has a data amount that is the same as a data amount of a macro block in the H.264 standard, and is a square of 16×16 pixels; and H is the length of the sliding window and W is the width of the sliding window. For the second format, referring to FIG. 4, block division is performed according to the size of a macro block in the H.264 standard, where a block has a data amount that is the same as the data amount of the macro block in the H.264 standard, and is a square of 16×16 pixels, that is, a macro block is a block; and H is the length of the sliding window and W is the width of the sliding window. For ease of distinguishing, a sub-block is used to specifically represent a block in the first format, and a macro block is used to represent a block in the second format below.

Figure 4:
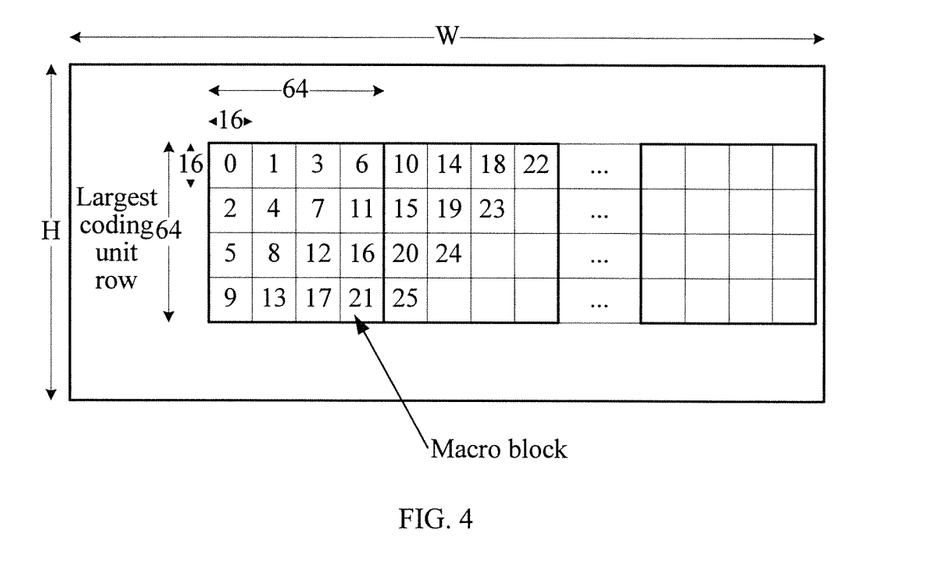
FIG. 4 is another schematic structural diagram of data read by a sliding window according to another embodiment of the present invention.

When reading the video signal data by using the sliding window, the video compressor reads a neighboring data block of each original video data block as reference data of this block, that is, the reference data includes data that provides reference for the video signal data to be compressed by the video compressor. Reading orders of video signal data in the existing HEVC standard and H.264 standard are different; therefore, reference data is also different.

In this case, reading orders in the HEVC standard and the H.264 standard are properly adjusted in order that storage and coding manners in the HEVC standard and the H.264 standard are compatible. For the first format, as shown in FIG. 3, a sub-block is read in an order that is the same as an order of reading a largest coding unit in the HEVC standard, that is, reading is performed in an order of numerals in FIG. 3. For the second format, as shown in FIG. 4, a macro block is read in an order of reading obliquely from an upper right corner to a lower left corner, and specifically, reading is performed in an order of numerals in FIG. 4. In this way, same reference data is used for the first format and the second format.

Figure 5:
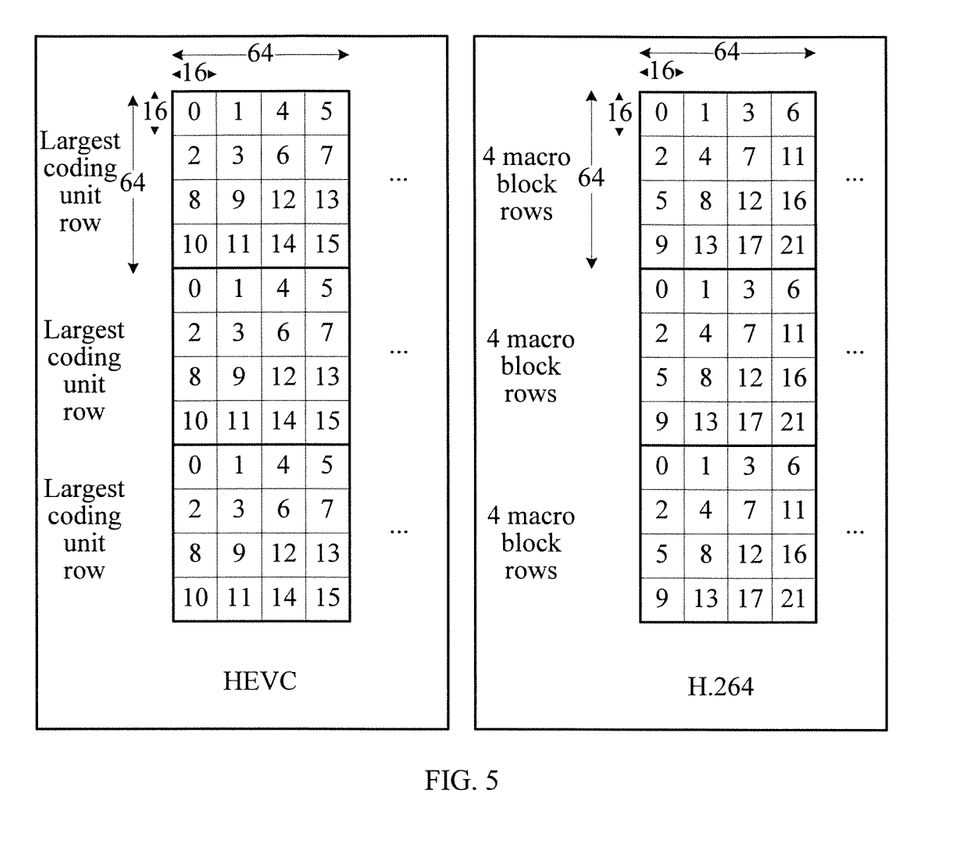
FIG. 5 is a schematic structural diagram of stored data according to another embodiment of the present invention.

In practice, because a reading speed and a coding speed are different, read data needs to be stored in a buffer. Because the reading order is changed herein, the storage manner of the read data is also changed, and a storage manner is provided herein. Data read by the video compressor by using the sliding window is stored in a double data rate 3 (Double Data Rate 3, DDR3) storage manner. Specifically, as shown in FIG. 5, for the first format, that is, the storage format of data of the HEVC standard in a DDR3, for each LCU of 64×64 pixels, luminance and chrominance of sub-blocks 0, 2, 8, and 10 of 4 consecutive neighboring LCUs are stored in neighboring DDR3 addresses in the DDR3 storage manner. For the second format, that is, the storage format of data of the H.264 standard in a DDR3, for an MB, luminance and chrominance of macro blocks 0, 2, 5, and 9 of 4 consecutive neighboring MB rows are stored in neighboring DDR3 addresses in the DDR3 storage manner.

In this way, data of 16×256 can be read continuously in the DDR3 each time, which increases the reading speed, and ensures that storage manners of HEVC and H.264 are the same.

S22: The video compressor predicts original video data according to the video signal data read by using the sliding window, so as to generate residual data and bitstream control information corresponding to the residual data.

In practice, a video signal (that is, reference data) read by the sliding window is stored in a DDR3; therefore, the reference data stored in the DDR3 needs to be read to predict the original video data. Specifically, referring to FIG. 6, bitstream data stored in the DDR3 and obtained after combining is read in the reading order in step 21 in the unit of blocks.

Figure 6:
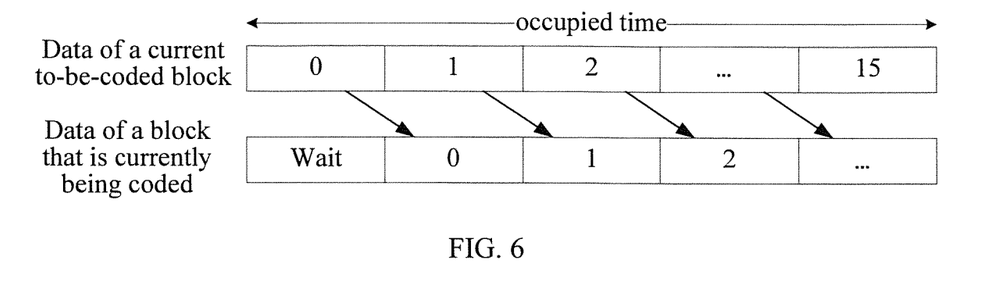
FIG. 6 is a schematic diagram of a method for reading a to-be-coded block according to another embodiment of the present invention.

The video compressor separately performs intra-frame prediction and inter-frame prediction on the original video data according to the video signal (that is, reference data) data read by the sliding window, so as to generate the residual data, that is, the residual data includes a difference between the original video data and the video signal (that is, reference data) read by the sliding window. At the same time, the video compressor acquires the bitstream control information corresponding to the residual data, where the bitstream control information includes a description of positions of the original video data and the video signal data read by using the sliding window and/or a description of a relationship between the original video data and the video signal data read by using the sliding window, where the descriptions are obtained after the prediction. Residual data generated by predicting, according to the first data, the original video data is first residual data and corresponding bitstream control information is first bitstream control information, and residual data generated by predicting, according to the second data, the original video data is second residual data and corresponding bitstream control information is second bitstream control information.

Figure 7:
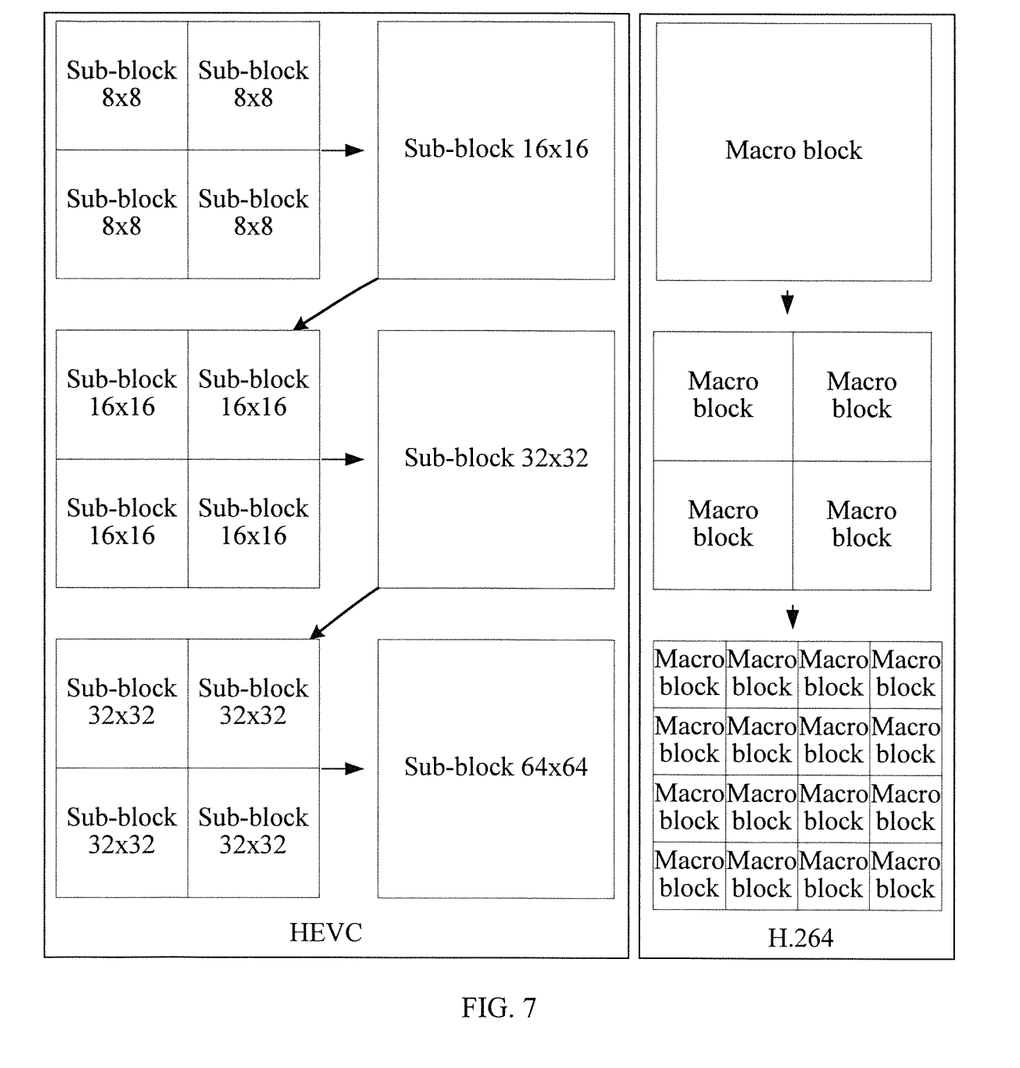
FIG. 7 is a schematic diagram of a bitstream prediction order according to another embodiment of the present invention.
Figure 8:
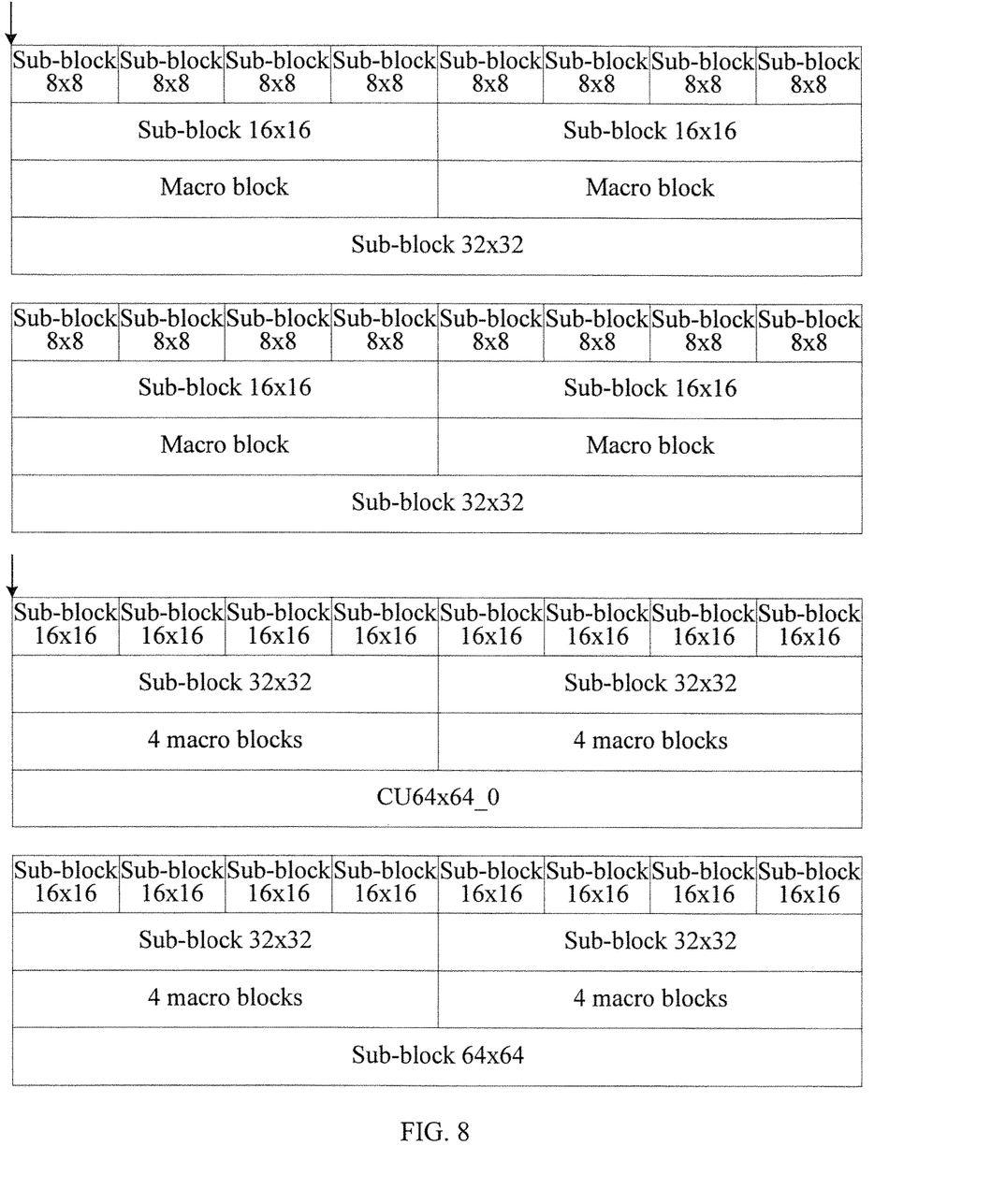
FIG. 8 is schematic diagram of another bitstream prediction order according to another embodiment of the present invention.

Specifically, referring to FIG. 7, when predicting an original video data block in a preset order, the video compressor uses a bottom-up intra-frame and inter-frame prediction method, that is, a small CU is first calculated, a large CU is then calculated, and the original video data of a same data amount is predicted within a same time. Specifically, referring to FIG. 8, for the first format, that is, the HEVC standard, 4 data blocks of 8×8 pixels, namely, a sub-block of 16×16 pixels, are predicted. Within a same time, for the second format, that is, the H.264 standard, 1 macro block is predicted each time. When 4 sub-blocks of 16×16 pixels are predicted in the first format, 4 macro blocks are predicted in the second format. When 4 data blocks of 32×32 pixels are predicted in the first format, 16 macro blocks are predicted in the second format.

S23: The video compressor combines the residual data and the bitstream control information corresponding to the residual data to generate the bitstream data.

The first residual data is combined with the first bitstream control information to generate the first bitstream data, and the second residual data is combined with the second bitstream control information to generate the second bitstream data.

In practice, both the residual data generated after the prediction and the bitstream control information corresponding to the residual data need to be stored in the DDR3 storage manner; in this case, the residual data and the bitstream control information corresponding to the residual data that are stored in the DDR3 storage manner are combined.

Figure 9:
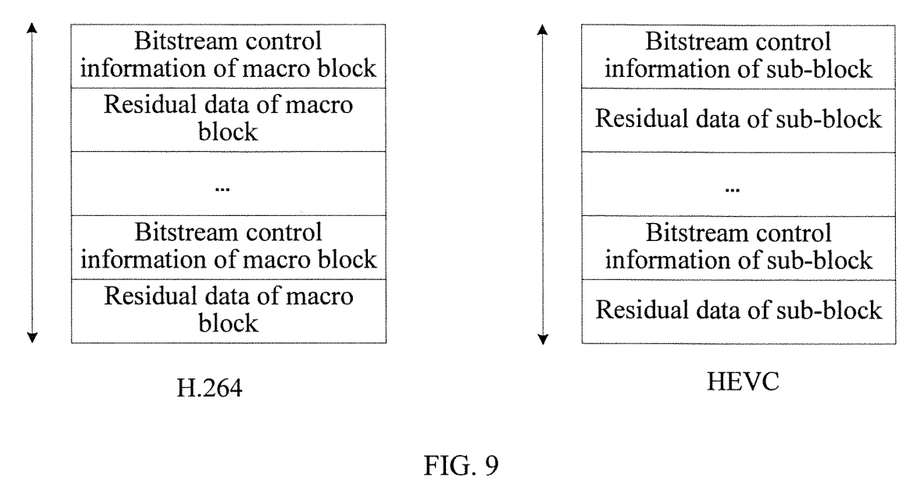
FIG. 9 is a schematic diagram of a method for combining bitstream control information and residual data according to another embodiment of the present invention.

Referring to FIG. 9, for the first format, that is, the HEVC standard, control information and residual data of one LCU row are stored in the DDR3; in this case, all sub-blocks covered by an LCU are stored in neighboring addresses. Data of LCU rows is continuously stored in the DDR3, and residual data in a same LCU is stored in neighboring addresses. For the H.264 standard, residual data of a macro block covered by one data block of the size of an LCU of the HEVC standard is stored in neighboring addresses.

An LCU of the HEVC standard and a macro block, covered by a data block of the size of the LCU of the HEVC standard, of the H.264 standard are stored in a same address segment, and occupy same space obtained by dividing the DDR3; in this way, the combined bitstream data has a same storage format in the storage space.

S24: The video compressor codes the bitstream data to generate a bitstream, where the first bitstream data is coded to generate a first bitstream, and the second bitstream data is coded to generate a second bitstream.

The first format and the second format, that is, context-based adaptive binary arithmetic coding (Context-based Adaptive Binary Arithmetic Coding, CABAC) modules in the HEVC standard and the H.264 standard, are similar from the perspective of protocols of the HEVC standard and H.264 standard during syntax element binarization and context modeling; therefore, after the reading order is adjusted, a storage format of intermediate data needed for coding the first bitstream data is the same as a storage format of intermediate data needed for coding the second bitstream data.

In this way, storage formats and coding orders of the first format and the second format, that is, storage formats and coding orders of the HEVC standard and the H.264 standard, are made to be the same by changing a reading method and a reading order, and the effect of being compatible is achieved.

According to the video compression method provided by this embodiment of the present invention, H.264 compression and HEVC compression are implemented on one chip by properly adjusting reading and coding orders of H.264 and HEVC, so that resource consumption and costs of video compression are reduced.

An embodiment of the present invention provides a video compressor, configured to implement the video compression methods provided by the foregoing method embodiments. Specifically, referring to FIG. 10, a video compressor 10 includes: a reading unit 101 and a coding unit 102.

Figure 10:
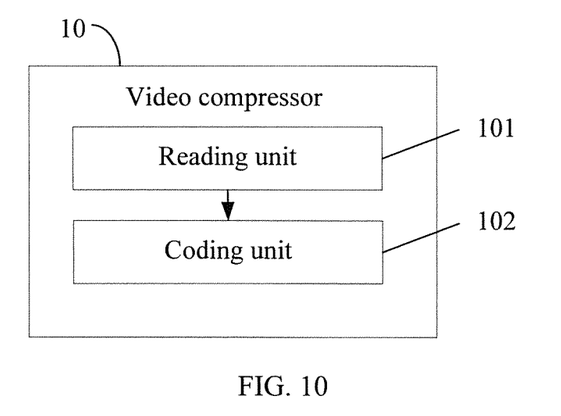
FIG. 10 is a schematic structural diagram of a video compressor according to an embodiment of the present invention.

The reading unit 101 is configured to read video signal data by using a sliding window to generate bitstream data, where the reading unit 101 separately reads the video signal data in the sliding window according to a first format and a second format, where video signal data read according to the first format is first data and generated bitstream data is first bitstream data, and video signal data read according to the second format is second data and generated bitstream data is second bitstream data.

The coding unit 102 is configured to code the bitstream data generated by the reading unit 101 to generate a bitstream, where a bitstream generated by coding the first bitstream data is a first bitstream, and a bitstream generated by coding the second bitstream data is a second bitstream, where the second format is a format preset according to the first format.

According to the video compressor provided by this embodiment of the present invention, H.264 compression and HEVC compression are implemented on one chip by properly adjusting reading and coding orders of H.264 and HEVC, so that resource consumption and costs of video compression are reduced.

Figure 11:
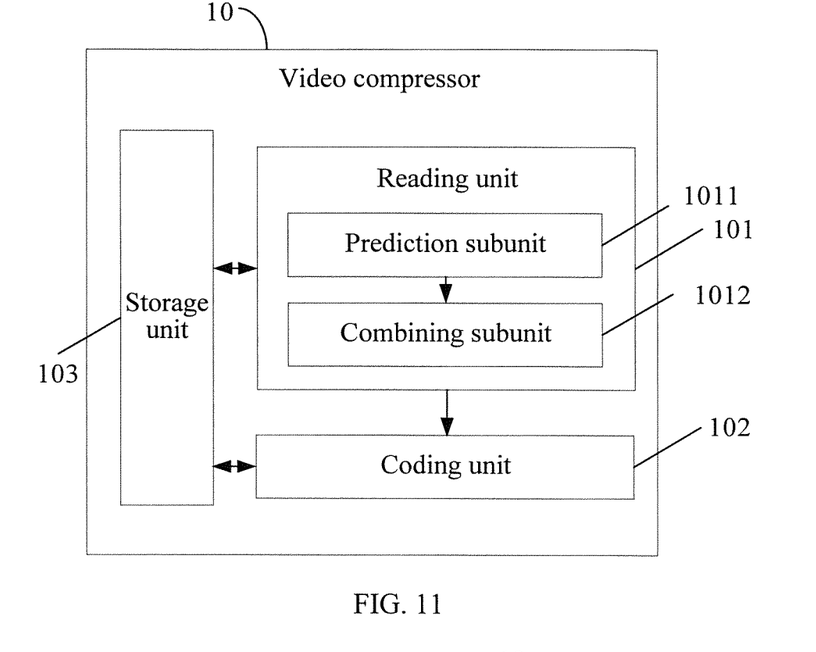
FIG. 11 is a schematic structural diagram of another video compressor according to an embodiment of the present invention.

Optionally, referring to FIG. 11, the reading unit 101 of the video compressor 10 provided by this embodiment of the present invention includes a prediction subunit 1011 and a combining subunit 1012.

The prediction subunit 1011 is configured to predict original video data according to the video signal data read by using the sliding window, so as to generate residual data, where the prediction includes intra-frame prediction and inter-frame prediction.

The prediction subunit 1011 performs intra-frame prediction and inter-frame prediction on the original video data of a same data amount within a same time.

The prediction subunit 1011 is further configured to acquire bitstream control information corresponding to the residual data.

The combining subunit 1012 is configured to combine the residual data generated by the prediction subunit 1011 and the stream control information generated by the prediction subunit 1011 to generate the bitstream data, where first residual data is combined with first bitstream control information to generate the first bitstream data, and second residual data is combined with second bitstream control information to generate the second bitstream data.

Residual data generated by predicting, according to the first data, the original video data is the first residual data and corresponding bitstream control information is the first bitstream control information, and residual data generated by predicting, according to the second data, the original video data is the second residual data and corresponding bitstream control information is the second bitstream control information.

The residual data includes a difference between the original video data and the video signal data read by using the sliding window, and the bitstream control information includes a description of positions of the original video data and the video signal data read by using the sliding window and/or a description of a relationship between the original video data and the video signal data read by using the sliding window, where the descriptions are obtained after the prediction.

Optionally, the reading unit 101 is further configured to divide the video signal data into blocks, where a data amount of a block read in the first format is the same as that of a block read in the second format.

The prediction subunit 1011 predicts an original video data block in a preset order according to the video signal data read by using the sliding window.

Further optionally, the video compressor 10 further includes a storage unit 103.

The storage unit 103 is configured to store intermediate data needed for coding by the coding unit 102 during context modeling, where a storage format of intermediate data needed for coding the first bitstream data is the same as a storage format of intermediate data needed for coding the second bitstream data.

According to the video compressor provided by this embodiment of the present invention, H.264 compression and HEVC compression are implemented on one chip by properly adjusting reading and coding orders of H.264 and HEVC, so that resource consumption and costs of video compression are reduced.

Figure 12:
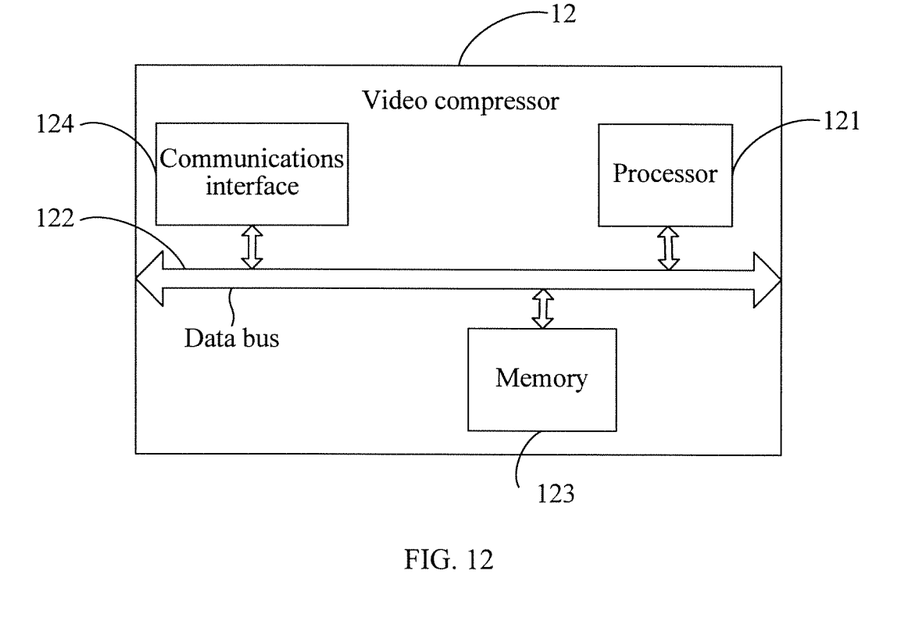
FIG. 12 is a schematic structural diagram of a video compressor according to another embodiment of the present invention.

An embodiment of the present invention further provides a video compressor 12. Referring to FIG. 12, the video compressor 12 includes: at least one processor 121, a data bus 122, a memory 123, and a communications interface 124, where the at least one processor 121, the memory 123, and the communications interface 124 are connected and complete mutual communication by using the data bus 122.

The data bus 122 may be an industry standard architecture (Industry Standard Architecture, ISA) bus, a peripheral component interconnect (Peripheral Component, PCI) bus, an extended industry standard architecture (Extended Industry Standard Architecture, EISA) bus, or the like. The data bus 122 may be classified into an address bus, a data bus, a control bus, and the like. For ease of description, in FIG. 12, the data bus 122 is represented by using only one bold line, which does not mean that there is only one bus or one type of bus.

The memory 123 is configured to store executable program code and corresponding data, where the program code includes a computer operation instruction. The memory 123 may include a high-speed RAM memory, and may also include a non-volatile memory. In the present invention, the memory is at least configured to store reference data, residual data, and bitstream control information.

The processor 121 may be a central processing unit CPU, an application specific integrated circuit ASIC, or one or more integrated circuits configured to implement the embodiments of the present invention.

The communications interface 124 is configured to implement data exchange between the video compressor 12 and the outside.

The processor 121 is further configured to call the program code in the memory 123 to perform the operations of the reading unit 101 and the coding unit 102 in the foregoing apparatus embodiment. For a specific description, refer to the apparatus embodiments correspond to FIG. 10 and FIG. 11, and details are not provided herein again.

Through the descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that facilitates transmission of a computer program from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of instructions or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in the definition of medium. For example, a disk (Disk) and disc (disc) used in the present invention includes a compact disc CD, a laser disc, an optical disc, a digital versatile disc (DVD), a floppy disk and a Blu-ray disc, where the disk generally copies data magnetically, and the disc copies data optically by using lasers. The foregoing combination should also fall within the protection scope of the computer-readable medium.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A video compression method, comprising:
   separately dividing, by a video compressor, video signal data into blocks according to a first format and a second format, wherein a size of each block in the first format is the same as a size of each block in the second format;
   reading, by the video compressor, the blocks of the video signal data by using a sliding window to generate bitstream data, wherein the video compressor separately reads the blocks of the video signal data in the sliding window according to the first format and the second format, wherein the video signal data read according to the first format is first data and generated bitstream data according to the first format is first bitstream data, and the video signal data read according to the second format is second data and generated bitstream data according to the first format is second bitstream data;
   predicting, by the video compressor, original video data according to the video signal data read by using the sliding window, so as to generate residual data and bitstream control information corresponding to the residual data, wherein the predicting comprises intra-frame predicting and inter-frame predicting;
   combining, by the video compressor, the residual data and the bitstream control information to generate the bitstream data, wherein first residual data is combined with first bitstream control information to generate the first bitstream data, and second residual data is combined with second bitstream control information to generate the second bitstream data, wherein a largest coding unit (LCU) of the first bitstream data and a macro block of the second bitstream data are stored in a same address segment of a memory and occupy same-size spaces in the memory; and
   coding, by the video compressor, the bitstream data to generate a bitstream, wherein a bitstream generated by coding the first bitstream data is a first bitstream, and a bitstream generated by coding the second bitstream data is a second bitstream, wherein the second format is a format preset according to the first format.

2. The video compression method according to claim 1, wherein:
   residual data generated by predicting, according to the first data, the original video data is the first residual data and corresponding bitstream control information is the first bitstream control information, and residual data generated by predicting, according to the second data, the original video data is the second residual data and corresponding bitstream control information is the second bitstream control information, and
   the residual data comprises a difference between the original video data and the video signal data read by using the sliding window, and the bitstream control information comprises a description of positions of the original video data and the video signal data read by using at least one of the sliding window and a description of a relationship between the original video data and the video signal data read by using the sliding window, wherein the descriptions are obtained after the prediction.

3. The video compression method according to claim 2, wherein predicting, by the video compressor, original video data according to the video signal data read by using the sliding window comprises:
   performing, by the video compressor, intra-frame prediction and inter-frame prediction on the original video data of a same data amount within a same time.

4. The video compression method according to claim 2, wherein a data amount of each block read in the first format is the same as that of each block read in the second format.

5. The video compression method according to claim 4, wherein predicting, by the video compressor, original video data according to the video signal data read by using the sliding window comprises:
   predicting, by the video compressor, an original video data block in preset order according to the video signal data read by using the sliding window.

6. A video compressor, comprising:
   a processor configured to:
   separately divide video signal data into blocks according to a first format and a second format, wherein a size of each block in the first format is the same as a size of each block in the second format;
   read the blocks of the video signal data by using a sliding window to generate bitstream data, wherein the processor is configured to separately read the blocks of the video signal data in the sliding window according to the first format and the second format, wherein the video signal data read according to the first format is first data and generated bitstream data according to the first format is first bitstream data, and the video signal data read according to the second format is second data and generated bitstream data according to the first format is second bitstream data;
   predict original video data according to the video signal data read by using the sliding window, so as to generate residual data and bitstream control information corresponding to the residual data, wherein the processor is configured to predict the original video data using intra-frame predicting and inter-frame predicting;
   combine the residual data and the bitstream control information to generate the bitstream data, wherein first residual data is combined with first bitstream control information to generate the first bitstream data, and second residual data is combined with second bitstream control information to generate the second bitstream data, wherein a largest coding unit (LCU) of the first bitstream data and a macro block of the second bitstream data are stored in a same address segment of a memory and occupy same-size spaces in the memory; and code the bitstream data to generate a bitstream, wherein a bitstream generated by coding the first bitstream data is a first bitstream, and a bitstream generated by coding the second bitstream data is a second bitstream, wherein the second format is a format preset according to the first format.

7. The video compressor according to claim 6, wherein: residual data generated by predicting, according to the first data, the original video data is the first residual data and corresponding bitstream control information is the first bitstream control information, and residual data generated by predicting, according to the second data, the original video data is the second residual data and corresponding bitstream control information is the second bitstream control information, and the residual data comprises a difference between the original video data and the video signal data read by using the sliding window, and the bitstream control information comprises a description of positions of the original video data and the video signal data read by using at least one of the sliding window and a description of a relationship between the original video data and the video signal data read by using the sliding window, wherein the descriptions are obtained after the prediction.

8. The video compressor according to claim 7, wherein the processor is configured to perform intra-frame prediction and inter-frame prediction on the original video data of a same data amount within a same time.

9. The video compressor according to claim 7, wherein a data amount of each block read in the first format is the same as that of each block read in the second format.

10. The video compressor according to claim 9, wherein the processor is configured to predict an original video data block in a preset order according to the video signal data read by using the sliding window.

11. The video compression method according to claim 1, further comprising:

storing, by the video compressor, the read blocks of the video signal data in the memory, wherein the memory has a double data rate 3 (DDR3) format.

* * * * *